United States Patent [19]

Chen

[11] Patent Number: 5,087,332
[45] Date of Patent: Feb. 11, 1992

[54] PROCESS FOR MAKING A THIN FILM MAGNETIC HEAD WITH SINGLE STEP LIFT-OFF

[75] Inventor: Johnny C. Chen, San Jose, Calif.

[73] Assignee: Read-Rite Corp., Milpitas, Calif.

[21] Appl. No.: 740,064

[22] Filed: Aug. 5, 1991

[51] Int. Cl.⁵ .............................................. C25D 5/02
[52] U.S. Cl. .................................. 205/135; 204/192.2; 204/192.22
[58] Field of Search ..................... 204/15, 38.1, 192.2, 204/192.22

[56] References Cited

U.S. PATENT DOCUMENTS 4,481,071 11/1984 Anderson ........................ 204/192.22

Primary Examiner—T. M. Tufariello
Attorney, Agent, or Firm—Nathan N. Kallman

[57] ABSTRACT

A process for making thin film magnetic heads includes forming a precisely defined back gap opening used for magnetic closure of the P1 and P1 pole pieces. A mushroom-like photoresist structure having a cap layer supported by a stem layer is formed over the P1 pole piece by a double resist spin and double exposure method with a critical baking step to harden previously deposited photoresist layers between the first exposure and the second photoresist spin. The cap layer defines the back gap opening. When the mushroom-like photoresist structure is removed by a single step lift-off with a solvent, the back gap opening is formed.

9 Claims, 4 Drawing Sheets

PROCESS FOR MAKING A THIN FILM MAGNETIC HEAD WITH SINGLE STEP LIFT-OFF

FIELD OF THE INVENTION

This invention relates to an improved process for producing a thin film magnetic head and in particular to the use of a liftoff process to enable the formation of the magnetic closure of the pole pieces of a thin film magnetic head.

BACKGROUND OF THE INVENTION

Semiconductor technology is generally employed for the manufacture of thin film magnetic heads. Since the invention is directed to a specific portion of the process of thin film head production, it should be understood that the description that follows does not include, for ease of explanation and clarity, the large number of process steps that are typically employed but are not deemed to be necessary for disclosing the invention and which are well known to those skilled in the art. The conventional approach for production of thin film magnetic heads, which comprise thin film transducers disposed on head sliders, employs a wafer or substrate 2 made of a ceramic material, such as titanium carbide for example, as shown in FIGS. 1 to 3. At first, the wafer 2 is polished to provide a smooth surface on which a very thin layer of aluminum oxide is deposited. The insulating aluminum oxide layer is lapped and polished to a specified thickness in order to eliminate defects. A first pole piece P1 of a nickel iron alloy, such as Permalloy, is deposited and the pattern of the P1 pole piece and an adjoining interconnect layer is formed by standard masking and photolithographic processes. The interconnect layer is used to connect a bonding pad to one end of a coil assembly 20 disposed between the P1 pole piece and a second pole piece P2. The P1 pole piece and the interconnect layer are plated to a desired thickness and any undesired nickel alloy material as well as the seed layer used for producing the P1 layer are removed by etching.

After deposition of the P1 pole piece, a thin layer of gap material of aluminum oxide 28 is deposited over the entire surface of the P1 pole piece layer. The oxide layer 28 is processed to pattern the nonmagnetic transducing gap layer that is to be disposed between the P1 and P2 pole pieces. A portion of the oxide layer 28, in the area of the back gap and at a via formed in the interconnect and a via at the bonding pad, is removed by standard masking and etching steps.

An insulation layer 24 is then deposited and its pattern defined to be slightly larger than the pattern of the coil assembly 20 which is to be subsequently deposited. The insulation layer 24 is opened at a via of the interconnect and a via of the back gap closure to allow necessary interconnections. To form the first coil assembly 20, a seed layer of titanium or chromium is deposited and a copper layer is deposited thereover. The pattern of the first coil assembly 20 is then defined by masking and electroplating techniques and the photoresist and seed layer are removed. A second insulation layer 23, second coil assembly 19 and a third insulation layer 21 are deposited and formed in the same manner as the insulation layer 24 and first coil assembly 20. A fourth insulation layer 26 is then fabricated and is made slightly smaller than the first insulation layer 24 so that a gentle slope at the edges of the fourth insulation layer 26 is formed. The fourth insulation layer 26 covers the coil assembly 20 and second coil assembly 19 except at the back gap closure and at a via that allows connection of an end of the coil assembly 20 and second coil assembly 19 to external circuitry.

The upper pole piece P2 is then fabricated with the same nickel iron alloy material as the P1 pole piece and makes contact with the P1 pole piece at an opening 12 formed in the transducing gap layer 28 to establish a magnetic closure. The P2 pole piece is later connected to a bonding pad formed by copper plating using a photoresist process. The copper is plated to a height above the highest point of the magnetic yoke structure. The completed thin film head is then encapsulated with a relatively thick aluminum oxide insulating layer which serves as a protective overcoat.

In the prior art approach to manufacturing thin film magnetic heads, an etching step is required during the formation of the nonmagnetic gap to provide the desired opening 12 for the P2 pole piece that is deposited later. It is known that the aluminum oxide gap material that is deposited varies from system to system and between one production line and another, and accordingly the etch rate of the gap material varies significantly. The etching process must be closely controlled to avoid overetching that can cause etchouts of the pole pieces and of the electrical lapping guides which are formed with the thin film heads.

SUMMARY OF THE INVENTION

An object of this invention is to provide an improved process for forming the back gap opening after deposition of the gap material for providing magnetic closure of the pole pieces of a thin film magnetic head.

Another object of this invention is to provide a process for fabricating a thin film magnetic head using a single step lift-off process whereby no etching is required during lift-off of photoresist material.

Another object is to provide a process for fabricating a thin film head wherein overetching is eliminated by precisely controlled and defined undercutting.

According to this invention, a process for fabrication of a thin film magnetic head uses a single step lift-off procedure for precisely forming an opening of specified dimension in the back gap area. In the implementation of the process, a first positive photoresist layer is deposited over a defined portion of the P1 pole piece layer. The first photoresist layer is used to support a second photoresist layer having a larger area so that a mushroom-like structure is produced, wherein the first layer serves as the stem and the second layer is the cap. A layer of nonmagnetic gap material is deposited over the second photoresist or cap layer and over the exposed outer portions of the P1 pole piece. The cap layer of the mushroom-like structure protects the area directly beneath the extending portions of the cap layer to ensure that no gap material is deposited adjacent to the stem layer. In this way, an open region is provided for solvent to enter and dissolve the mushroom-like photoresist structure. The cap and stem photoresist layers of the mushroom-like structure are dissolved at a predetermined rate and for a given time to provide an opening around the lift-off pad of the stem layer. The remaining gap material around the opening serves as the transducing gap for the thin film head. The single step lift-off for dissolving the photoresist ensures that there is no overetching of the aluminum oxide layer thereby preventing etchout of the P2 pole material during subsequent processing steps.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 1:
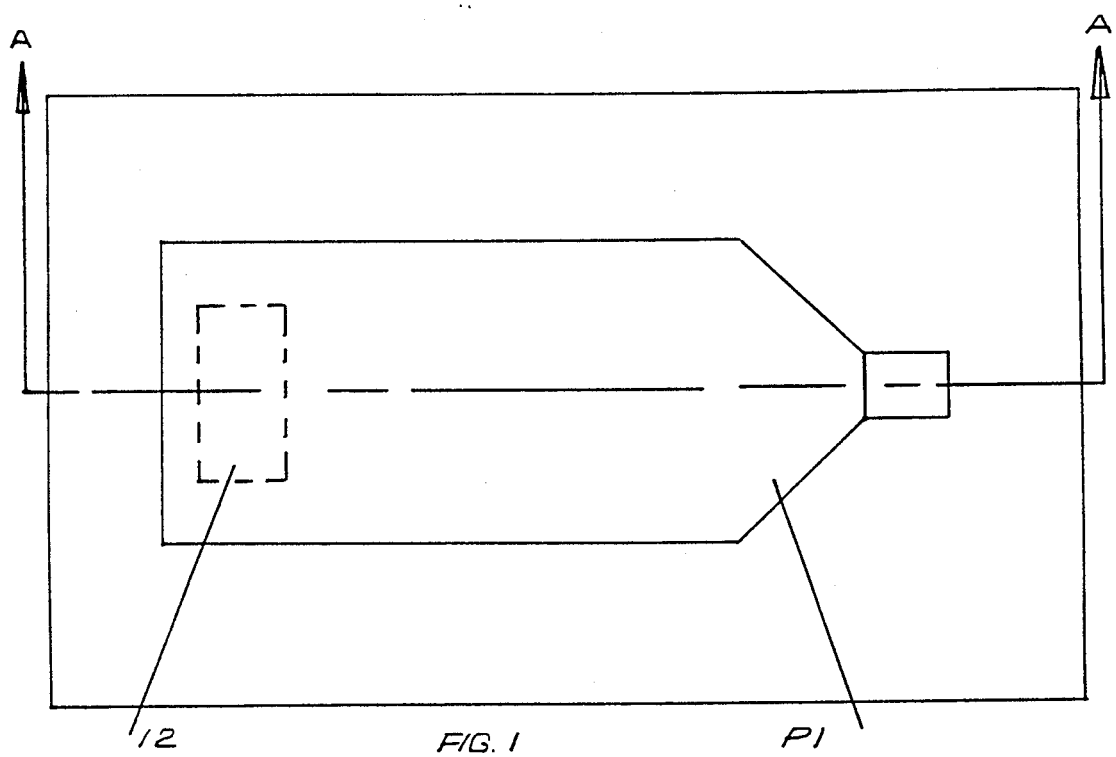
FIG. 1 is a top plan view showing the P1 pole piece and a desired opening to enable the P2 pole piece to form a magnetic closed path with the P1 pole piece.
Figure 2:
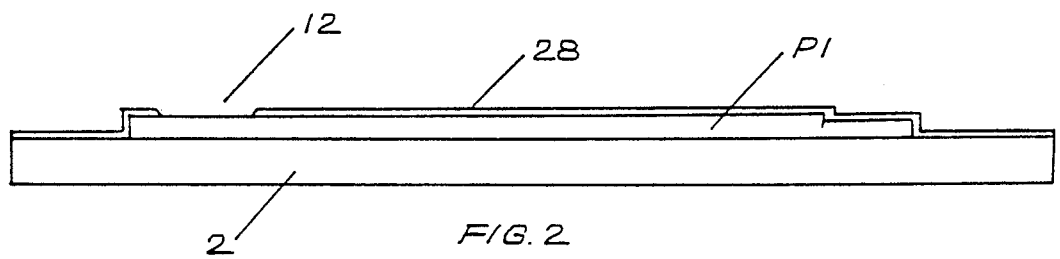
FIG. 2 is a cross-sectional view taken along line A-A of FIG. 1.
Figure 3:
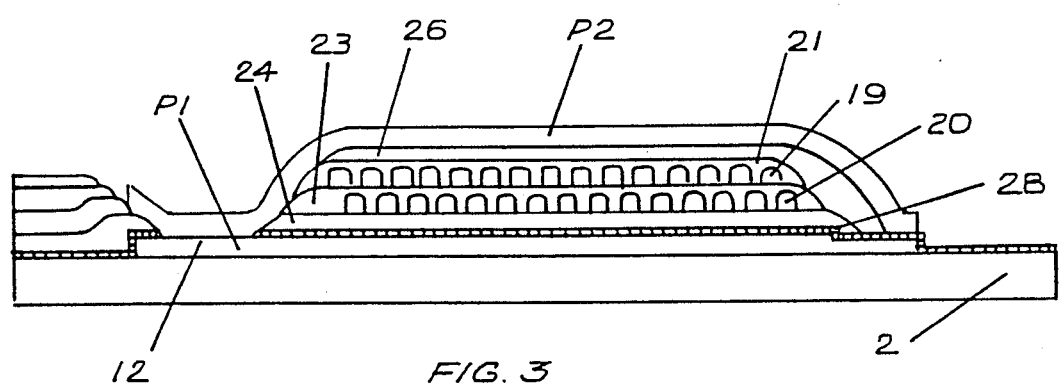
FIG. 3 is a cross-sectional view representing a completed thin film magnetic head.
Figure 4:
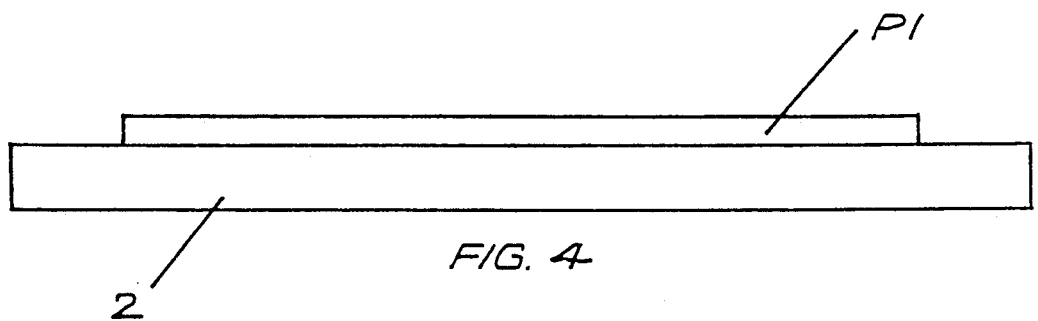
FIG. 4 is a cross-sectional side view of a P1 pole piece deposited on a substrate.

FIGS. 1-3 show a substrate 2 on which a patterned P1 pole piece is deposited, as implemented in the prior art. An opening 12 is provided in the oxide gap layer 28 for the purpose of effectuating a magnetic closure of the P1 and P2 pole pieces. FIG. 3 depicts a completed thin film head having a first coil assembly 20, a second coil assembly 19 and insulating layers 23, 21 and 26 over the complete coil assembly. The patterned P2 pole piece is formed over the insulation layer 26. The P2 pole piece makes contact with the P1 pole piece through the opening 12 at the back gap so that a closed magnetic path or closure is provided.

Figure 5:
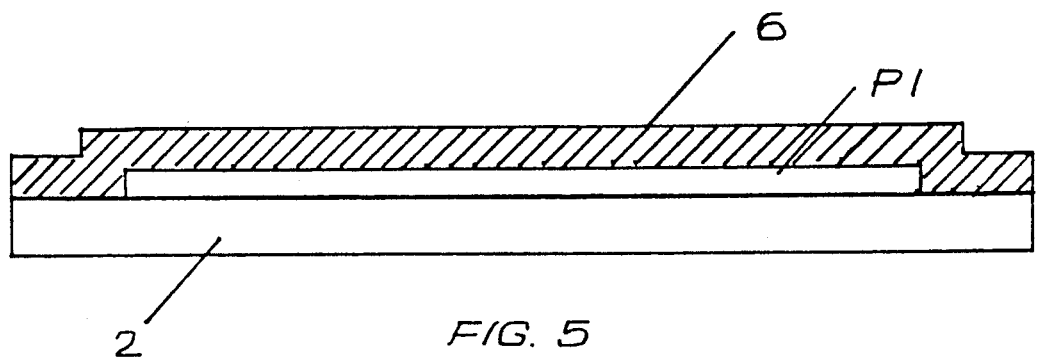
FIGS. 5 to 9 are cross-sectional side views that illustrate the formation of the mushroom-type photoresist structure disposed above the P1 pole piece layer, in accordance with this invention.
Figure 6:
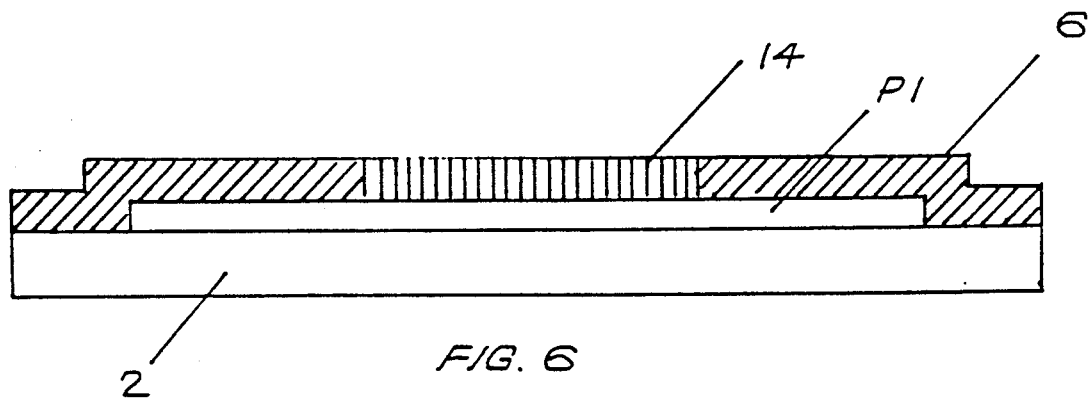

In an embodiment of this invention, a wafer or substrate 2 made of a ceramic material such as titanium carbide, is highly polished on one surface to a very smooth mirror finish. With reference to FIGS. 4-8, a nickel iron alloy or Permalloy layer P1 is deposited by r.f. sputtering or electroplating to a thickness of about 3 microns over the entire wafer 2. The patterned P1 Permalloy layer is defined by a masking step using standard photolithographic processes to form the bottom P1 pole piece. As shown in FIG. 5, a positive photoresist layer 6 is spun on and deposited to a thickness of about 5 microns over the P1 pole piece. The photoresist 6 is soft baked for about 45 minutes at approximately 90° Centigrade. The photoresist layer 6 is then aligned and exposed to ultraviolet (UV) light with a small gap mask for about 15 seconds to define a central region 14. In accordance with the inventive process, the wafer 2 is baked after the pattern expose in a nitrogen environment at 120° Centigrade for approximately 45 minutes to harden the surface of the photoresist layer, including region 6 and region 14, which is one of the most critical steps of the process disclosed herein.

Figure 7:
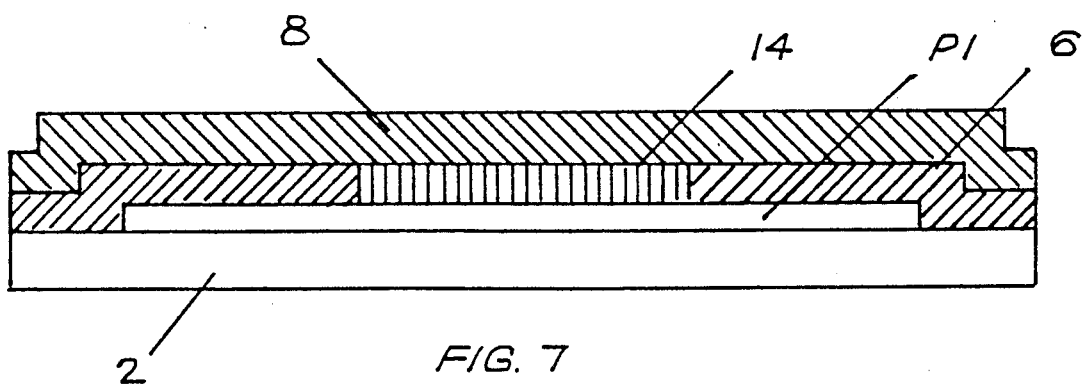
Figure 8:
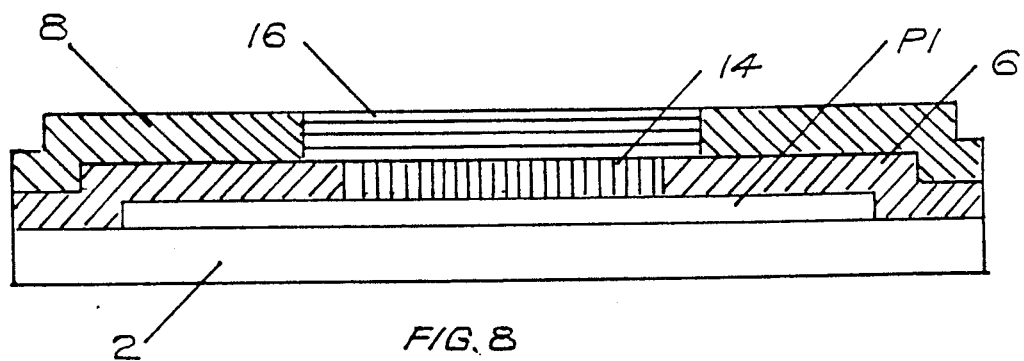

As shown in FIG. 7, a second layer of positive photoresist 8 is then spun onto the surface of the hardened photoresist layer to a depth of about 5 microns and soft baked. The second photoresist layer 8 is then patterned by exposure of the outer region to UV light under a proper mask so as to define the unexposed central photoresist portion 16, shown in FIG. 8.

Figure 9:
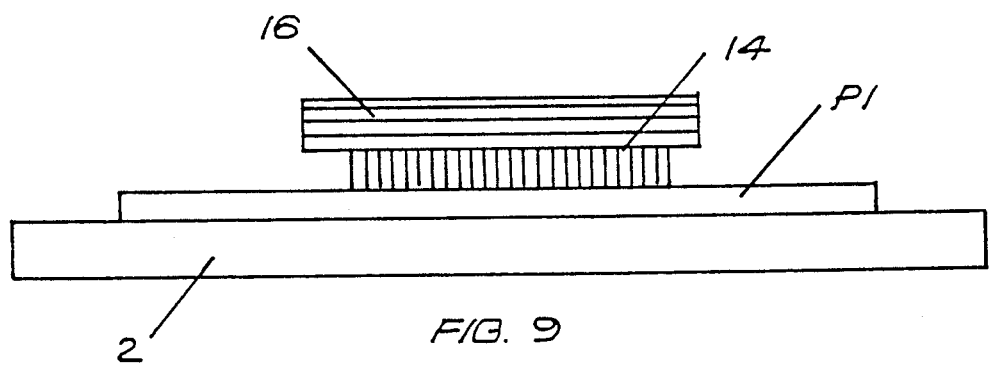

The central photoresist portion 16 is larger in area than the underlying central photoresist portion 14 and extends beyond the edges of the photoresist portion 14. The two photoresist layers, including regions 6 and 14 in the first layer and regions 8 and 16 in the second layer, are each developed with a positive photoresist developer, such as AZ400K, for about 160-180 seconds. The single step photoresist development results in a mushroom-like structure 30 with a stem portion 14 and cap portion 16, illustrated in FIG. 9.

Figure 10:
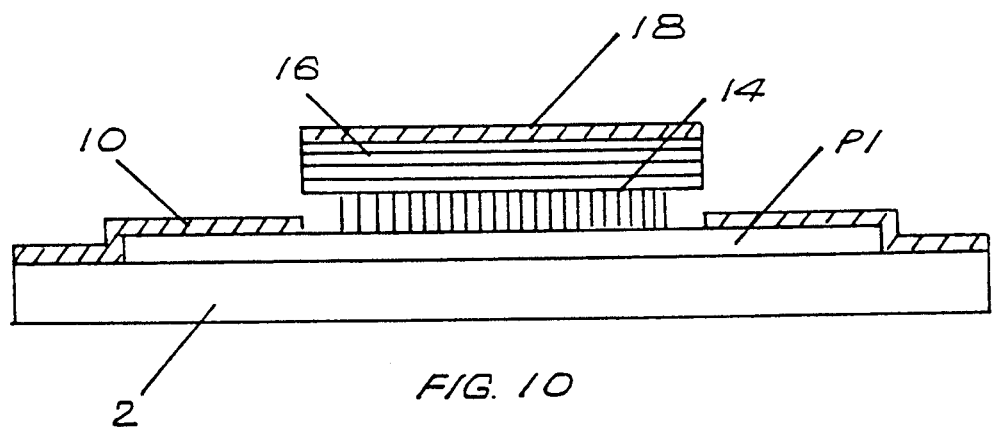
FIG. 10 is a cross-sectional side view showing the oxide gap material which is deposited partially over the mushroom-type photoresist structure and partially over the P1 pole piece with a single masking step.

Gap material of aluminum oxide is then deposited by r.f. sputtering to a thickness of about 6000 Angstroms across the whole wafer. A portion 18 of the oxide is disposed over the photoresist cap 16, and the outer portion 10 of the gap material is disposed over the P1 pole piece, as shown in FIG. 10.

Figure 11:
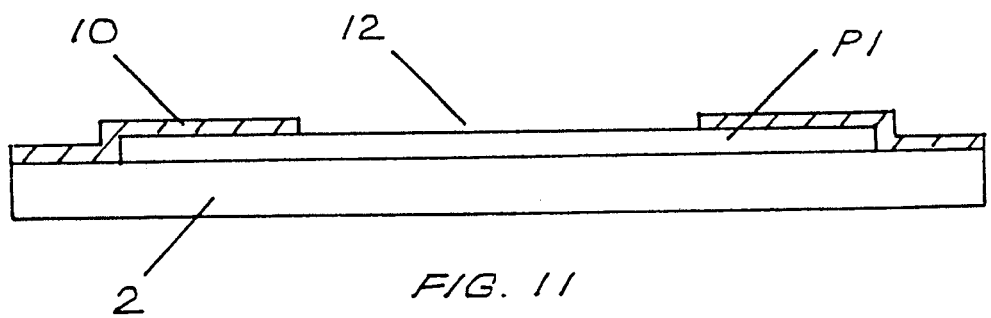
FIG. 11 is a cross-sectional side view showing the opening formed for the magnetic closure of the P1 and P2 pole pieces.

The mushroom-like structure, comprising layers 14, 16 and 18, is then removed by a single step lift-off process by dissolving the photoresist layers 14 and 16 with a suitable solvent, such as PRS1000. The extending top portion of the photoresist cap 16 ensures that no undesirable excess gap material will appear in the space between the photoresist stem 14 and the desired gap layer 10. Since the previously deposited gap oxide material did not enter the area beneath the extending parts of the photoresist cap 16, the solvent can make contact with the underlying photoresist stem 14 through the open space between the stem and the gap material 10, thereby allowing removal of the mushroom-like structure. As a result, an a precisely defined opening 12 of specified dimensions is formed, as shown in FIG. 11, to accommodate the P2 pole piece portion at the back gap so that a magnetic closure can be made with the P1 pole piece.

Figure 12:
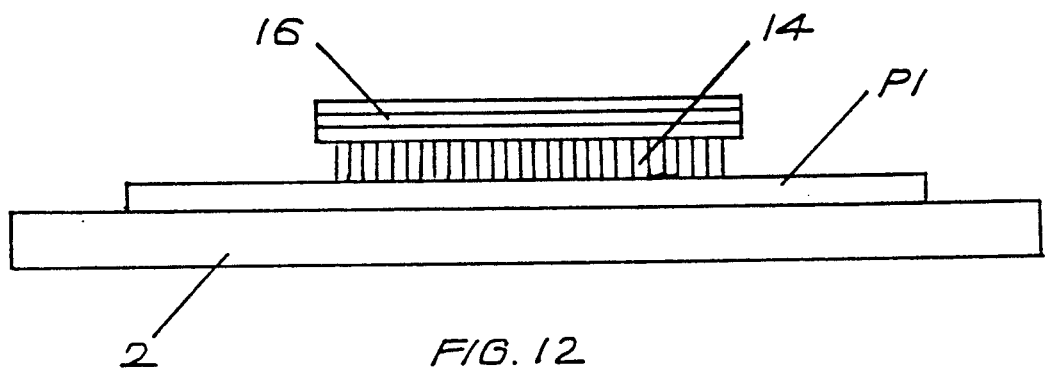
FIG. 12 is a cross-sectional side view illustrating the mushroom-like photoresist structure wherein the first deposited photoresist layer or stem of the structure is underdeveloped due to undefined undercutting.
Figure 13:
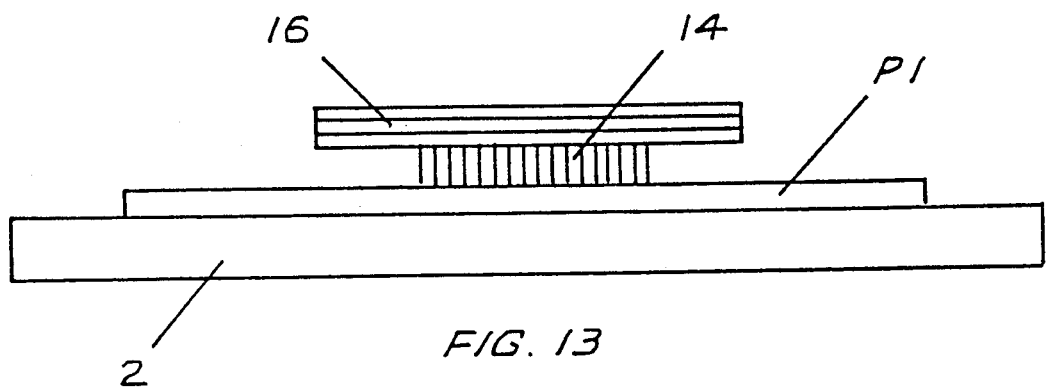
FIGS. 13 and 14 are cross-sectional side views showing overdeveloped conditions due to undefined undercutting around the stem photoresist layer of the mushroom-like structure.
Figure 14:
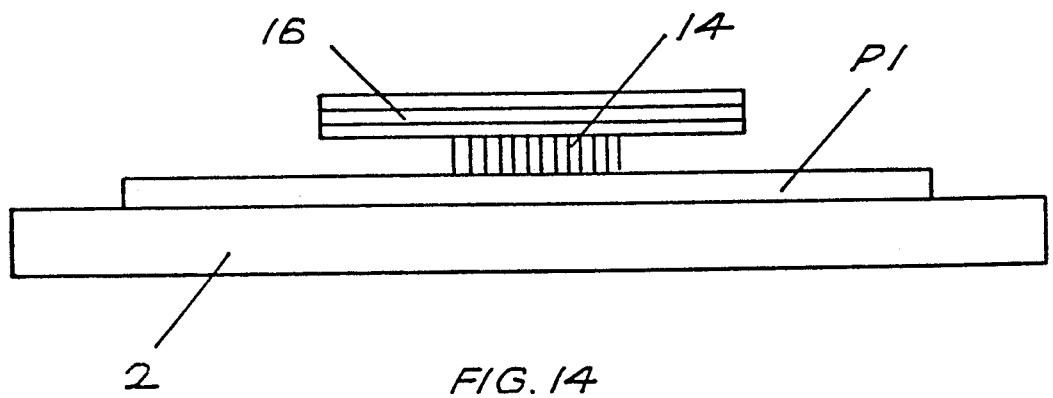

The defined undercutting achieved with the present invention allows the formation of a precisely dimensioned opening to accommodate the P2 pole piece without having excess gap material. FIG. 12 illustrates a mushroom-like structure which was subject to underdeveloping which can easily be caused by developing for a relatively short time that is insufficient due to undefined undercutting, e.g., significantly less than 160 seconds. FIGS. 13 and 14 show overdeveloping wherein the photoresist stems can collapse and result in failure of the back gap opening.

The present invention employs a double resist spin and double exposure process with a critical baking step i.e., baking the wafer in a nitrogen environment at 120° Centigrade for about 45 minutes, in between the first exposure and the subsequent second photoresist spin in order to define the mushroom-like structure with controlled undercutting of the photoresist. The mushroom-like structure is formed without etching to provide the back gap opening for the P1 and P2 pole closure after gap deposition. Since no etching is required and only solvent is used in the lift-off, the use of hazardous hydrogen fluoride is eliminated. Another feature of the invention is that the gap processing cycle is shortened by at least 25% when compared to presently known prior art processes.

What is claimed is:

1. A method of making a thin film head including first and second magnetic pole pieces comprising the steps of:

forming a nonmagnetic substrate;

depositing said first pole piece over said substrate;

forming a mushroom-like photoresist structure over said first pole piece, having a stem photoresist layer disposed over said first pole piece and a cap for the resist layer disposed over said stem layer, said cap layer having a portion extending beyond the perimeter of said stem layer and precisely defined to a given dimension;

depositing nonmagnetic gap material over said cap layer and over the exposed region of said first pole piece in a single step;

lifting off said mushroom-like structure to leave a precisely defined opening for a magnetic closure of said pole pieces.

2. A method as in claim 1, wherein said stem layer of photoresist is spun onto said first pole piece and said cap layer is spun onto said stem layer.

3. A method as in claim 2, wherein said stem and cap layers are deposited to a thickness of about five microns each.

4. A method as in claim 1, wherein the lifting off step comprises dissolving said stem and cap photoresist with a solvent.

5. A method as in claim 1, wherein said nonmagnetic substrate is formed from a ceramic material.

6. A method as in claim 1, wherein said first and second pole pieces are formed from a nickel iron alloy and deposited by the step of r.f. sputtering or electroplating to a thickness of about three microns each.

7. A method as in claim 1, wherein said forming step comprises masking and exposure to ultraviolet light to define the geometry of said stem and cap photoresist layers.

8. A method as in claim 1, wherein said mushroom-like structure is defined by a double resist spin and a double exposure process.

9. A method as in claim 8, including the step of baking said structure in a nitrogen environmentat 120° Centrigade for about 45 minutes between said first exposure and said first resist spin.

* * * * *